US008177101B1

(12) United States Patent
Blake

(10) Patent No.: US 8,177,101 B1
(45) Date of Patent: May 15, 2012

(54) ONE TURN ACTUATED DURATION SPRAY PUMP MECHANISM

(76) Inventor: William Sydney Blake, Linwood, NJ (US)

( * ) Notice: Subject to any disclaimer, the term of this patent is extended or adjusted under 35 U.S.C. 154(b) by 1301 days.

(21) Appl. No.: 11/702,734

(22) Filed: Feb. 6, 2007

(51) Int. Cl.
*G01F 11/00* (2006.01)
(52) U.S. Cl. .................. 222/340; 222/380; 239/333
(58) Field of Classification Search .............. 222/255, 222/340, 372, 380, 383.1; 239/333
See application file for complete search history.

(56) References Cited

U.S. PATENT DOCUMENTS

| | | | | |
|---|---|---|---|---|
| 3,746,261 A * | 7/1973 | Nozawa et al. | | 222/340 |
| 3,790,034 A * | 2/1974 | Horvath | | 222/340 |
| 3,797,748 A * | 3/1974 | Nozawa et al. | | 222/340 |
| 3,799,448 A * | 3/1974 | Nozawa et al. | | 222/340 |
| 4,147,280 A * | 4/1979 | Spatz | | 222/179.5 |
| 4,155,485 A * | 5/1979 | Spatz | | 222/340 |
| 4,174,052 A * | 11/1979 | Capra et al. | | 222/207 |
| 4,220,264 A * | 9/1980 | Gamadia | | 222/207 |
| 4,243,159 A * | 1/1981 | Spatz | | 222/188 |
| 4,872,595 A * | 10/1989 | Hammett et al. | | 222/209 |
| 5,183,185 A * | 2/1993 | Hutcheson et al. | | 222/209 |
| 5,240,153 A * | 8/1993 | Tubaki et al. | | 222/385 |
| 5,474,215 A * | 12/1995 | Tubaki et al. | | 222/385 |
| 6,609,666 B1 * | 8/2003 | Blake | | 239/337 |
| 6,708,852 B2 * | 3/2004 | Blake | | 222/321.5 |
| 7,845,521 B2 * | 12/2010 | Blake | | 222/321.5 |

* cited by examiner

*Primary Examiner* — Kevin P Shaver
*Assistant Examiner* — Daniel R Shearer
(74) *Attorney, Agent, or Firm* — Dennis M. Lambert

(57) ABSTRACT

A mechanically operated, one-turn actuation, duration spray pump mechanism for dispensing product from a container, wherein a cylinder is fixed to a cylinder retainer closure adapted to be attached to a container. In use, the cylinder extends into the container, and a splined shaft extends coaxially into the cylinder from a rotatable actuating collar connected to the cylinder retainer closure. At least one piston is mounted for axial movement on the shaft in sealed sliding relationship with the shaft and the cylinder. Interengaged structure between the piston and cylinder causes the piston to move axially within the cylinder to draw product into the cylinder and to store energy in an energy storage device when the actuating collar and shaft are rotated. The stored energy moves the piston to exert pressure on the product in the cylinder and dispense it when a discharge valve is opened.

21 Claims, 9 Drawing Sheets

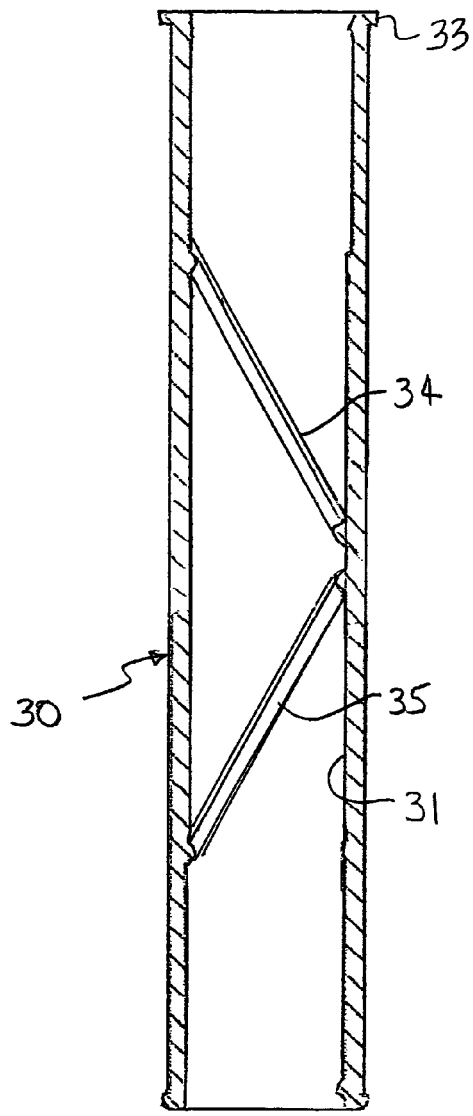
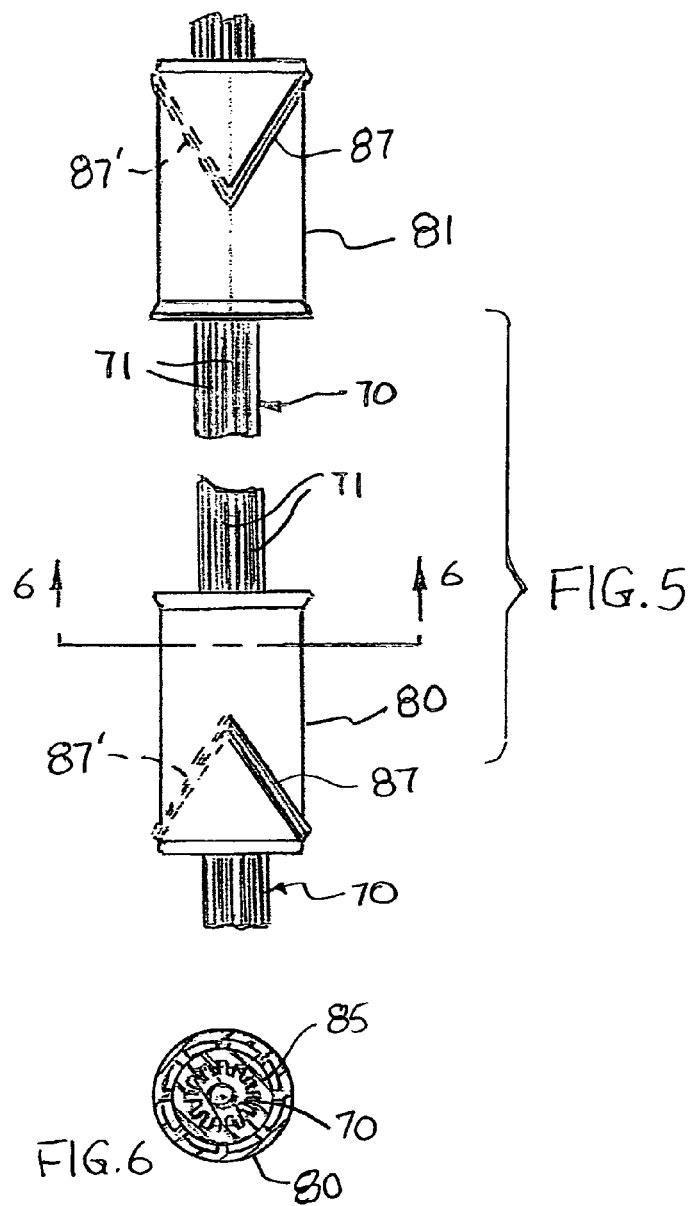
FIG.4
FIG.5
FIG.6

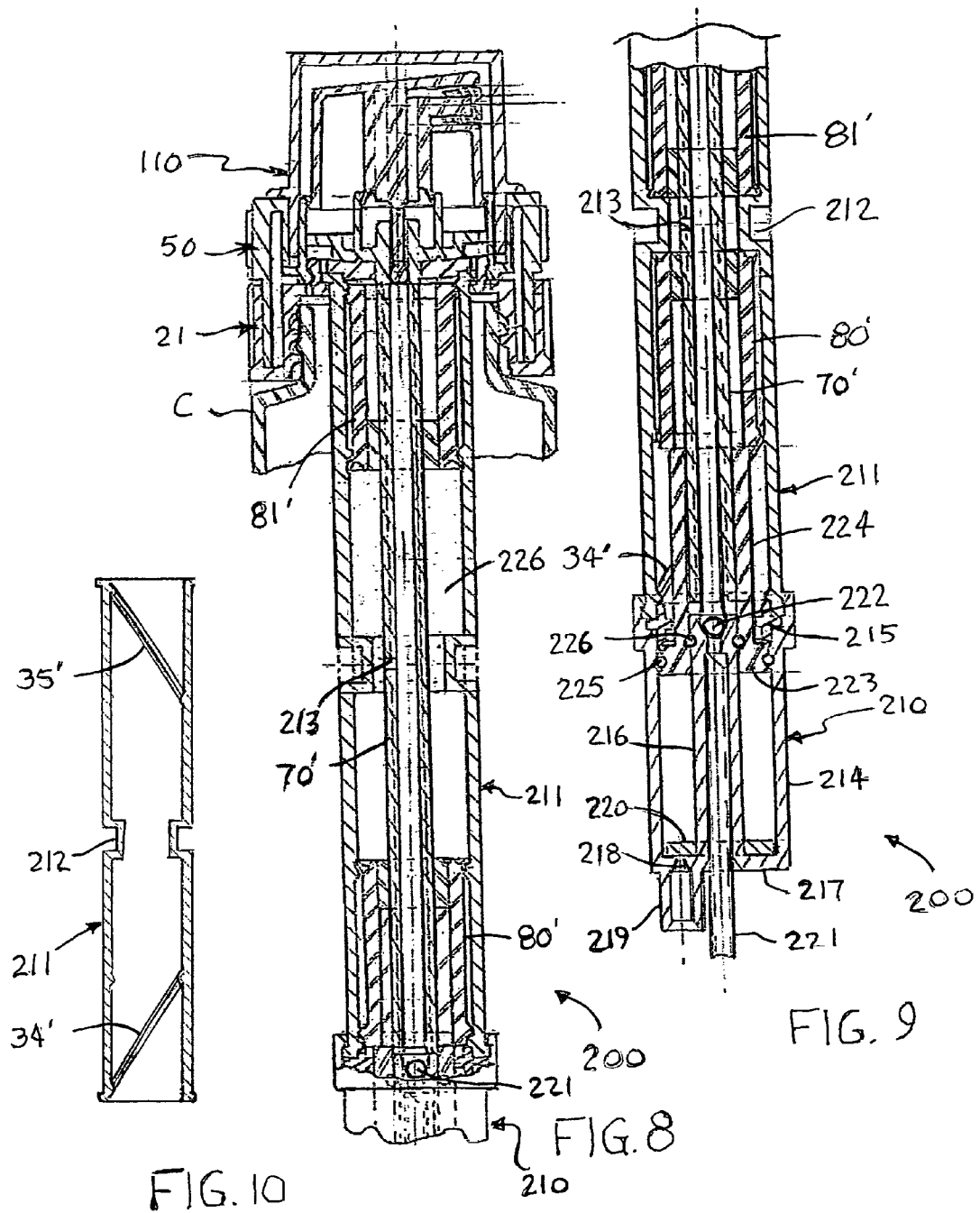

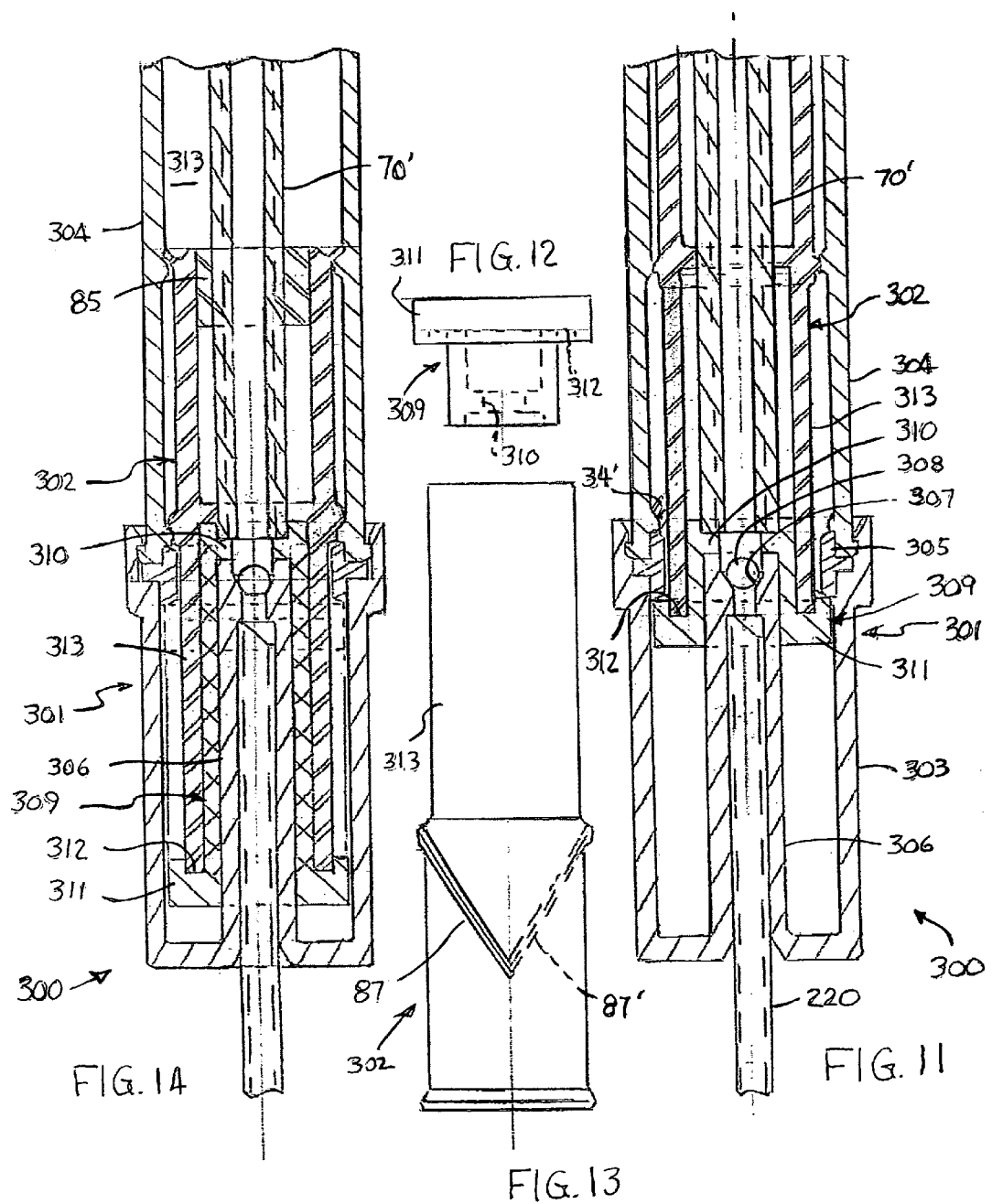

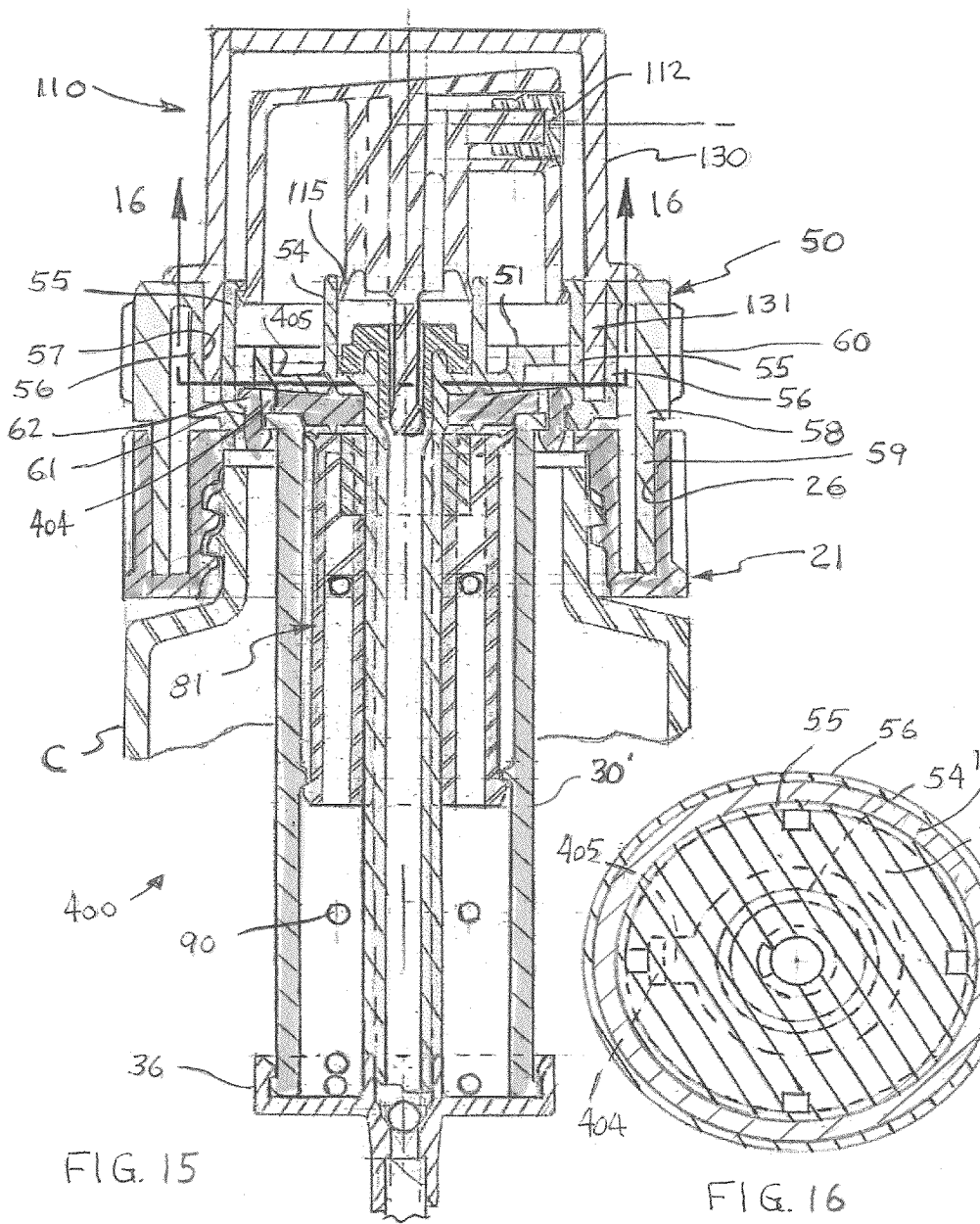

ONE TURN ACTUATED DURATION SPRAY PUMP MECHANISM

BACKGROUND OF THE INVENTION

1. Field of the Invention

The present invention relates to dispensers, specifically to duration spray dispensers that are energized mechanically and pressurized by a non-chemical means.

2. Description of Related Art

Both chemically driven and mechanically operated spray dispensers have been in use for many years and are still popular due to their convenience. However, aerosol dispensers that use chemical propellants have come under increasing scrutiny and restrictions are being imposed upon them due to their adverse impact upon the environment, hazards associated with handling them, and associated insurance issues. Also, conventional non-chemical mechanical spray dispensers are typically unfavorably compared with chemically driven aerosols because they are bulky and commonly require multiple steps in their operation, making them difficult to operate, especially by persons suffering from a disability such as arthritis. They also require a large number of parts and a large amount of material to produce them, which due to the increasing cost of energy makes them prohibitively expensive to manufacture. This, in turn, makes them too costly for use at the lower price range of consumer products, Moreover, there is a general reluctance to change from the aerosol propellant driven systems, including bag in a can or pressurized piston in a can devices.

Some mechanically operated aerosol devices incorporate storage chambers that require a step in which a metered amount of product must be obtained first and then transferred into a power chamber that provides the pressure for dispensing the product over a certain duration. These types of devices are energy inefficient and degrade over shelf life and or usage, as well as being too costly due to their exotic material structure and dynamic nature for use with a range of desirable products that currently use finger pumps or chemical aerosol valves. Bag in can devices are complex systems that do not have all the attributes of chemical aerosol delivery.

By way of example, U.S. Pat. Nos. 4,387,833 and 4,423,829 exhibit some of the above shortcomings.

U.S. Pat. No. 4,147,280 A to Spatz requires dual separate helixes and a cap for unusual manipulation to deliver product as a spray.

U.S. Pat. No. 4,167,941 A to Capra et. al. requires a storage chamber.

U.S. Pat. No. 4,174,052 A to Capra et al requires a storage chamber.

U.S. Pat. No. 4,174,055 A to Capra et al requires a storage chamber.

U.S. Pat. No. 4,222,500 A to Capra et at requires a storage chamber.

U.S. Pat. No. 4,872,595 A to Hammett et at requires a storage chamber.

U.S. Pat. No. 5,183,185 A to Hutcheson et al requires a storage chamber.

U.S. Pat. No. 6,708,852 B2 to Blake requires a storage chamber and multiple action to setup.

Other patents for reference are U.S. Pat. No. 4,423,829 and U.S. Pat. No. 4,387,833 that may be of interest. All have drawbacks in expense for commercial acceptance and feasibility of being mass produced at high levels in existing market applications.

Despite the efforts of such devices as shown in the forgoing patents, there remains a need for a more convenient to use, less expensive, and compact mechanically energized duration spray mechanism that performs to dispense product comparably to the chemically energized dispensers in common use. Specifically, it would be desirable to have a one turn actuated duration spray pump delivery system that is free of the faults with conventional chemical and mechanically energized aerosol dispensers.

SUMMARY OF THE INVENTION

It is an object of this invention to provide a duration spray dispenser that does not rely upon chemical propellants for its operation.

It is another object of the present invention to eliminate the need for the charging chamber technology used in conventional mechanically operated aerosol dispensers and to reduce the multiple steps involved with operating such delivery systems and to provide a mechanically operated system that is close in convenience to chemically energized dispenser systems.

It is another object of the present invention to make the size of the system closer to that of finger and trigger pumps and to create a competitive edge.

A further object of the invention is to provide a mechanically energized spray dispenser that produces a duration spray without requiring multiple strokes.

It is another object of the present invention to provide a mechanically energized operating system for spray dispensers that enables a duration spray to be obtained without requiring multiple operating steps and that enables such dispensers to have appealing neck finishes, including for products that currently utilize finger pumps.

It is another object of the present invention to provide a mechanically operated spray dispenser that has a number of parts comparable to the number of parts in single stroke pumps and that provides longer duration sprays than conventional mechanically energized dispensers.

It is another further object to provide a duration spray dispenser that is mechanically energized by a single turn of an actuator to pressurize product and ready it for dispensing, wherein different power sources may be used with the one-turn actuator to exert pressure on and dispense the product.

Additional objects, advantages, and novel features of the invention will be set forth in part in the description that follows, and in part will become apparent to those skilled in the art upon examination of the following or may be learned by practice of the invention. The objects and advantages may be realized and attained by means of the instrumentalities and in combinations particularly pointed out in the appended claims.

To achieve the foregoing and other objects, and in accordance with the purposes of the present invention as broadly described herein, different embodiments of the mechanism of the invention are disclosed. The new mechanisms eliminate several functions that are necessary in conventional prior art systems, i.e. having to make several turns in two different direction, one to fill a charging chamber and the other to transfer the chamber volume to an elastic storage reservoir before spraying can be initiated through a conventional valve.

The mechanically operated mechanisms of the present invention enable a consumer to employ a single turn of 360 degrees on an actuating collar, and by pressing down on the spray actuator obtain a duration spray of the product to be sprayed. Since the new mechanisms are able to be used in much smaller neck finishes, the piston-to-cylinder diameters allow for easier actuation with much less force. These forces are comprised of only the friction that is encountered at the interface of the thread-to-helix combinations between the opposing pistons and cylinder portions that drive them. There is no need to control "spin back" that results from the driving force of the energy storage devices, such as springs, pneumatic assemblies, or elastic fitments stretching to create the forces that exert pressure on the product to be dispensed in these new mechanisms. These new mechanisms can be used with standard spray actuators or actuators as depicted in U.S. Pat. Nos. 6,543,703 B2 and 6,609,666 B1, for example.

More particularly, the present invention comprises a mechanically energized duration spray mechanism for use with a container of product to be dispensed, wherein the mechanism comprises:

a cylinder retainer closure having means thereon for attachment to an upper end of a container to close the container, said cylinder retainer closure having a central opening therethrough;

an elongate cylinder having an upper end, a closed lower end having an opening therethrough, and an interior surface defining a hollow bore extending through said cylinder, said cylinder upper end immovably connected to a bottom side of said cylinder retainer closure at a central portion thereof and depending therefrom with said hollow bore thereof in aligned registry with the central opening through said cylinder retainer closure;

a rotatable actuating collar connected to said cylinder retainer closure at an upper side thereof for rotational movement relative thereto but fixed against relative axial movement therebetween, said actuating collar having a central opening therethrough in aligned registry with the central opening through said cylinder retainer closure;

first valve means associated with the central opening through the actuating collar, and a valve actuator connected with the first valve means to move the first valve means between open and closed positions to selectively block or permit fluid flow through said central opening;

an elongate shaft having an upper end fixed to a central portion of said actuating collar and a lower end adjacent the lower end of said cylinder, said shaft extending through said central opening in said cylinder retainer closure and coaxially into said cylinder and being rotatable with said actuating collar but fixed against relative axial movement therebetween, said shaft having an interior hollow bore extending throughout its length, said hollow bore of said shaft being in aligned registry with said first valve means and with the opening through said closed lower end of said cylinder, said shaft having a splined outer surface in inwardly spaced relation to said cylinder interior surface and at least one opening therein establishing fluid communication between the hollow bore of said shaft and the hollow bore of said cylinder;

second valve means associated with said opening through said closed lower end of said cylinder, said second valve means operable to permit flow of product into said hollow bore of said cylinder but prevent reverse flow therethrough;

at least one annular piston mounted on said shaft in sealed axially sliding relationship relative thereto, said piston being fixed against rotational movement relative to said shaft and having an outer surface engaged with said interior surface of said cylinder in sealed sliding relationship thereto;

interengaged means between said outer surface of said at least one piston and said interior surface of said cylinder to cause said at least one piston to move axially in a first direction within said cylinder when said actuating collar and said shaft are rotated in a first direction relative to said cylinder, said movement of said at least one piston in said first direction being operable to draw product through said second valve means and into said hollow bore of said shaft and through said opening therein and into the hollow bore of said cylinder when said mechanism is mounted on a container of product; and energy storage means associated with said at least one piston and said cylinder to store energy when said at least one piston is moved in said first direction, said energy storage means being operable to move said at least one piston in a second direction opposite to said first direction to exert pressure on product drawn into said hollow bore of said cylinder and force it through said first valve means in said cylinder retainer closure when said mechanism is mounted on a container of product to be dispensed and said valve actuator is operated to move said first valve means to open position.

In accordance with a first form of the invention, the energy storage means comprises a spring engaged with said at least one piston to move it in said second direction.

In a second form of the invention, the energy storage means comprises a pneumatic pressure means connected with the cylinder bore, said pneumatic pressure means containing a gas and movement of said at least one piston in said first direction serving to compress said gas and pressurize it, said pressurized gas exerting a force on said at least one piston in said second direction, whereby when the mechanism is mounted on a container of product to be dispensed the at least one piston moves in the second direction to expel product from the cylinder bore upon opening of the first valve means.

In a third form of the invention, the energy storage means comprises an elastomeric member connected with said at least one piston so that the elastomeric member is elastically deformed when said at least one piston is moved in said first direction, exerting a force in said second direction on said at least one piston, whereby when said mechanism is mounted on a container of product to be dispensed said at least one piston moves in said second direction to expel product from said cylinder bore upon opening of said first valve means.

In a preferred embodiment, there are two pistons mounted on the shaft, said pistons being mounted for simultaneous movement in opposite directions relative to one another when said actuating collar and shaft are rotated and when said first valve means is opened.

According to one aspect of the preferred embodiment, the two pistons have at-rest positions at respective opposite ends of the cylinder, each said piston having a said first direction of movement away from their respective end of the cylinder and toward a longitudinally central portion of the cylinder upon rotation of the actuating collar and shaft in the first direction, and a said second direction of movement away from the central portion of the cylinder back toward the respective opposite ends of the cylinder. There is an opening at each of the opposite ends of the shaft, establishing fluid communication between the shaft bore and opposite ends of the cylinder bore between the respective pistons and respective adjacent ends of the cylinder, whereby upon movement of the pistons in their first directions product is drawn into the shaft bore and outwardly through the openings therein into the respective opposite ends of the cylinder bore.

The energy storage means comprises a spring engaged between the two pistons, said spring being compressed upon movement of the pistons in their first directions and operable to move the pistons in their respective second directions from the central portion of the cylinder back toward the respective opposite ends of the cylinder, whereby when the mechanism is mounted on a container of product to be dispensed, the pistons exert pressure on product in the opposite ends of the cylinder bore and force it back into the shaft bore and outwardly through the first valve means when the first valve means is opened.

According to another aspect of the preferred embodiment, the two pistons have at-rest positions at a longitudinally central portion of the cylinder, each said piston having a first direction of movement away from their central positions toward respective opposite ends of the cylinder upon rotation of the actuating collar and shaft in a first direction, and a second direction of movement away from the respective opposite ends of the cylinder and back toward the central portion of the cylinder. At least one opening in the shaft establishes fluid communication between the shaft bore and a central portion of the cylinder bore between the respective pistons, whereby when the mechanism is mounted on a container of product to be dispensed product is drawn into the shaft bore and outwardly through the opening therein into the central portion of the cylinder bore upon movement of the pistons in their first directions. The energy storage means comprises pneumatic means connected with the cylinder bore, said pneumatic means containing a gas and movement of the pistons in their first direction serving to compress the gas and pressurize it, said pressurized gas exerting a force on one of the pistons causing it to move in the second direction, which causes the shaft to rotate and thereby move the other piston in its second direction, whereby when the mechanism is mounted on a container of product to be dispensed the pistons move in their second direction to exert pressure on the product in the central portion of the cylinder bore to expel it from the cylinder bore upon opening of the first valve means.

Other features and advantages of the invention will become clear from the following detailed description and drawings.

The words "power source", "power generator" and "energy storage means" are used interchangeably herein to describe the spring means of the embodiment shown in FIGS. 2-7 and 15, the pneumatic means of the embodiment shown in FIGS. 8-10 and 17, and the stretchable elastic means of the embodiment shown in FIGS. 11-14.

BRIEF DESCRIPTION OF THE DRAWINGS

The accompanying drawings, which are incorporated in and form a part of the specification, illustrate the preferred embodiments of the present invention, and together with the descriptions, serve to explain the principles of the present invention.

In the Drawings:

FIG. 4 is a longitudinal sectional view of the dual action cylinder used in the embodiment of FIGS. 1-3.

FIG. 5 is a fragmentary exploded view in side elevation, with portions broken away, of both the upper and lower opposing pistons and the cogged shaft on which they slide.

FIG. 6 is a cross-sectional view taken along line 6-6 in FIG. 5, showing the engagement of the cogged shaft to the overmolded insert cog seal within a piston.

FIG. 8 is a fragmentary longitudinal cross sectional view of another embodiment of the operative mechanism, with the pistons shown in their charged position ready for dispensing product, wherein the spring of the previous embodiment is replaced by a pneumatic pressure force generator and the orientation of the opposing helixes and direction of movement of the pistons between at-rest and charged positions are reversed from the previous embodiment.

FIG. 9 is a fragmentary longitudinal sectional view of the embodiment in FIG. 8, with portions broken away, showing the pistons in their at-rest positions.

FIG. 10 is a longitudinal sectional view on a reduced scale of the cylinder used in the embodiment of FIGS. 8 and 9.

FIG. 11 is an enlarged partial longitudinal sectional view of another embodiment, shown at-rest, wherein the pneumatic pressure force generator of FIG. 8 is replaced by a stretchable elastic material fitment as a force generator.

FIG. 12 is a side view in elevation of the stretchable fitment from the assembly of FIG. 11, shown prior to attachment to the piston and in its relaxed or unstretched condition.

FIG. 13 is a side view in elevation of the piston used in the assembly of FIG. 11, shown inverted from its orientation as depicted in FIG. 11.

FIG. 14 is a partial longitudinal sectional view like FIG. 11, but showing the piston in its charged position and the elastic fitment stretched, ready to dispense.

FIG. 15 is a further enlarged fragmentary longitudinal sectional view of an alternate embodiment to FIGS. 2 and 3, wherein one of the pistons is eliminated and the cylinder is modified to accommodate it, while still retaining all other components with identical functioning.

FIG. 16 is a cross-sectional view taken along line 16-16 in FIG. 15, showing the venting that is employed in all embodiments.

DETAILED DESCRIPTION OF THE PREFERRED EMBODIMENTS

Figure 1:
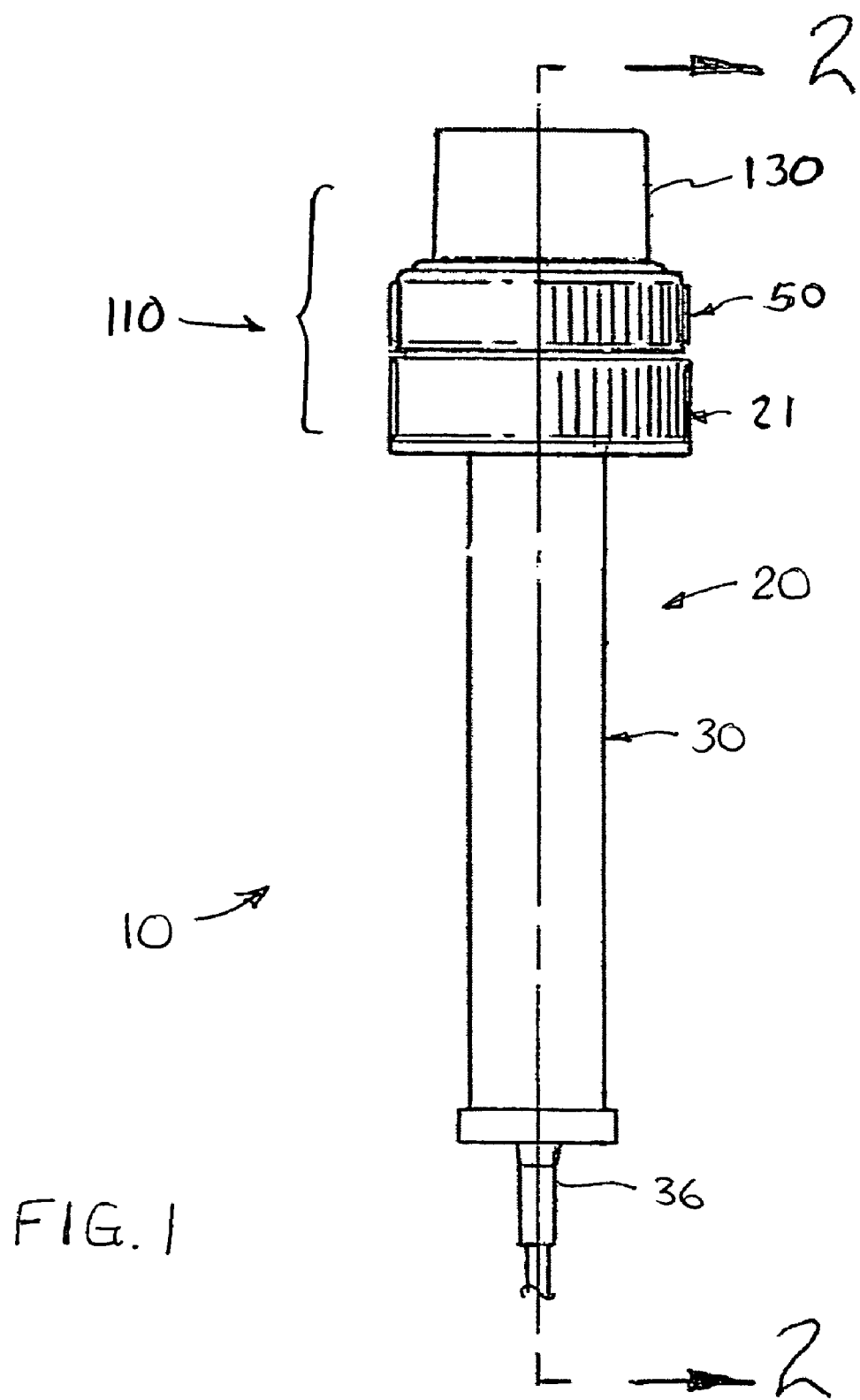
FIG. 1 is a full side view in elevation of a mechanically energized mechanism according to the invention, showing the mechanism without a container.

A first preferred embodiment of a mechanism according to the invention for conveniently delivering a duration spray with one turn of an actuator is indicated generally at 10 in FIGS. 1-7. The mechanism includes a pump assembly 20 and an actuator assembly 110 for operating the pump assembly.

The pump assembly 20 includes a cylinder retainer closure 21 having a transverse end wall 22 with a central opening 23 through it, a first wall 24 depending from the outer periphery of the end wall, and a second wall 25 joined to a bottom edge of the first wall and extending upwardly therefrom in outwardly spaced relationship to the first wall to define an annular upwardly open pocket 26. The first wall 24 has suitable means 27 on its inner surface for securing the cylinder retainer closure to an upper end of a container C.

An elongate cylinder 30 having open upper and lower ends and an interior surface defining a hollow bore 31 extending therethrough is attached at its upper end to the underside of the cylinder retainer closure 21 and depends therefrom into the container C with the hollow bore in aligned registry with the central opening 23 through the cylinder retainer closure. A plurality of anti-rotation lugs 32 on the cylinder retainer closure 21 engage with a serrated flange 33 on the upper end of the cylinder 30 to prevent relative rotation between the cylinder and the cylinder retainer closure. Two opposing multiple lead helixes 34 and 35 are formed on the interior surface of the cylinder 30, extending in opposite directions from the longitudinal center of the cylinder to locations spaced from respective opposite ends of the cylinder. A dip tube receptor 36 is attached to the lower end of the cylinder and has a dip tube 37 connected thereto and a flow passage 38 therethrough controlled by a ball check valve 39 operative to enable flow from the dip tube into the cylinder but prevent reverse flow from the cylinder into the dip tube. The dip tube receptor is maintained on the end of the cylinder by interengaged flanges 40 and 41 on the dip tube receptor and cylinder, respectively.

An actuating collar 50 is mounted for rotation on top of the cylinder retainer closure 21 and has a transverse wall 51 overlying the end wall 22 of the cylinder retainer closure, with a central opening 53 therethrough in aligned registry with the central opening 23 through the end wall 22. A cylindrical seal wall 54 extends upwardly from a central portion of the wall 51 in outwardly spaced concentric relationship to the openings 23 and 53, and first and second radially spaced cylindrical walls 55 and 56 on the outer edge of the wall 51 define an upwardly open annular pocket 57. An outer cylindrical wall 58 is connected to an upper edge of the wall 56 and extends downwardly in outwardly spaced concentric relationship to the wall 56. A lower portion of the wall 58 defines a false skirt 59 that is rotatably received in the pocket 26, and an outer upper portion thereof has a series of grip ribs 60 thereon to facilitate turning of the actuating collar. A plurality of retaining bosses 61 on an inner bottom edge of wall 55 are engaged beneath an annular lock-on bead 62 on an outer edge of the wall 22 of the cylinder retainer closure 21 to permit rotational movement of the actuating collar relative to the cylinder retainer closure but prevent axial displacement therebetween.

An elongate, tubular shaft 70 integral with the actuating collar depends from a central portion of the wall 51 and extends downwardly through the opening 23 in the cylinder retainer closure and coaxially into the cylinder 30, with its lower end positioned adjacent the lower end of the cylinder. The outer surface of the shaft is spaced radially inwardly from the inner surface of the cylinder and has axially extending splines 71 thereon. The shaft is rotatable with the actuating collar and has an interior hollow bore 72 extending throughout its length. The bore is in aligned registry with the central opening 53 through the actuating collar and with the passage 38 in the dip tube receptor. Feed slots 73 and 74 open through the side of the shaft at opposite ends thereof, respectively, establishing fluid communication between the hollow bore in the shaft and opposite ends of the cylinder bore.

In the form of the invention shown in FIGS. 1-7 two annular pistons 80 and 81 are slidably mounted on the shaft 70 in opposed relationship to one another, dividing the cylinder bore into a central chamber 82 between the pistons and product charge chambers 83 and 84 at opposite ends of the cylinder. The pistons are produced with over-molded cog seal inserts 85 and 86, respectively, that provide a fluid-tight seal between the pistons and the shaft and that coact with the splines 71 on the shaft to lock the pistons for rotation with the shaft but permit axial sliding movement of the pistons on the shaft. As seen best in FIG. 5, the outer surface of each piston has raised camming helixes 87 and 87' thereon, and as seen best in FIGS. 2 and 3, the confronting ends of the pistons have annular channels 88 therein terminating at their inner ends in a set of ribs 89.

Figure 2:
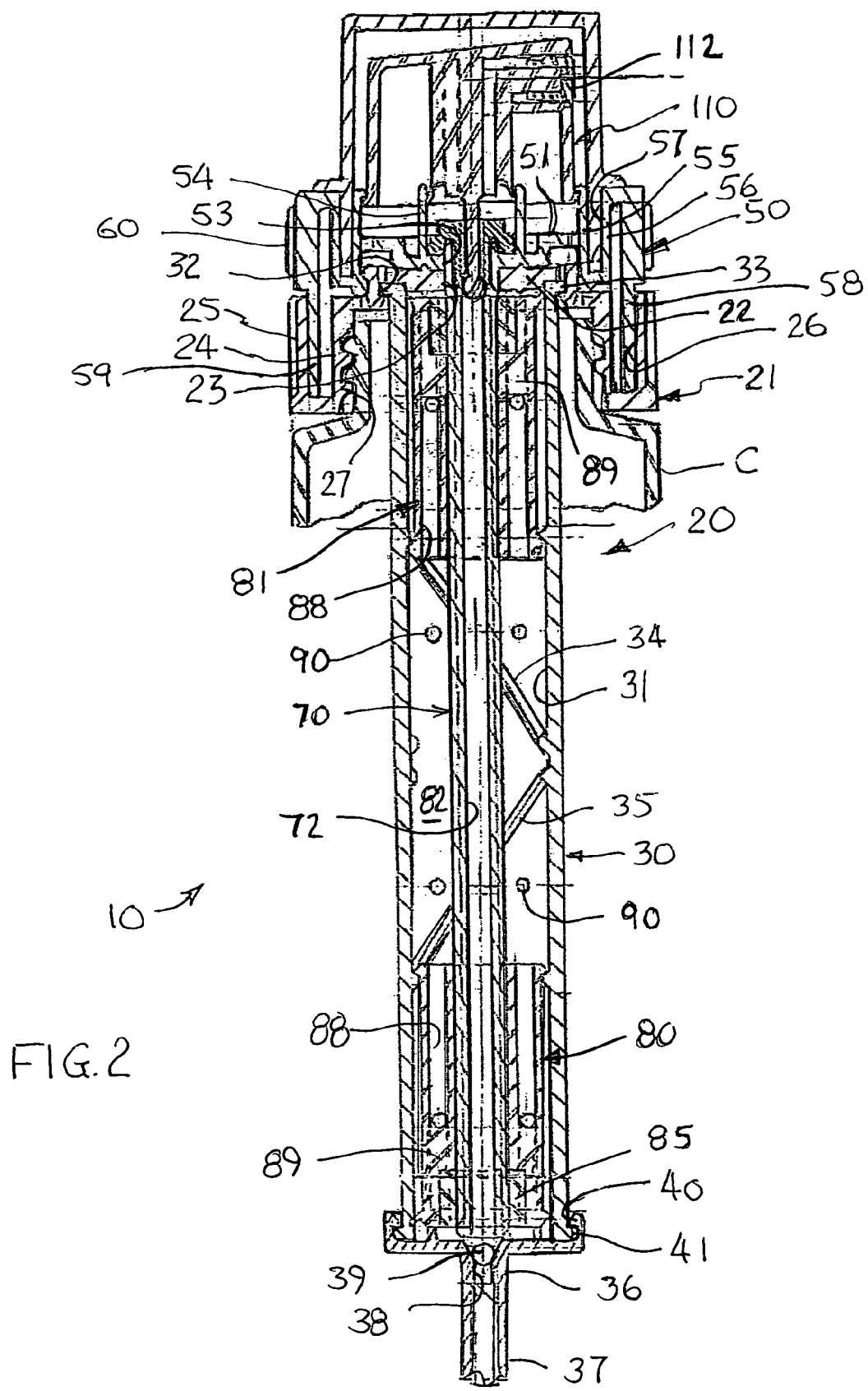
FIG. 2 is an enlarged cross-sectional view taken along line 2-2 in FIG. 1, depicting a first preferred form of the invention with the opposing pistons in the "at rest" position.

A spring 90 in the central chamber 82 is engaged between the pistons, with opposite ends of the spring received in the channels 88 and engaged against the ribs 89, urging the pistons away from one another to their at-rest positions shown in FIG. 2. When the actuating collar 50 and shaft 70 are rotated, the camming helixes 87 and 87' on the pistons cooperate with the helixes 34 and 35 in the cylinder bore to move the pistons axially toward one another from their at-rest positions shown in FIG. 2 to their charged positions shown in FIG. 3.

A first valve means is associated with the actuating collar 50 and shaft 70 to control discharge of product from the product charge chambers. The first valve means comprises a retainer ring 100 held in the opening 53 in the actuating collar 50 by engagement between retention beads 101 on the inside bottom of seal wall 54 and a circumferential interference bead 102 on the outer periphery of the retainer ring. A valve seat extension 103 extends through the opening 53 and into the upper end of the tubular shaft 70, terminating at its lower end in an inwardly tapered valve seat 104.

Figure 3:
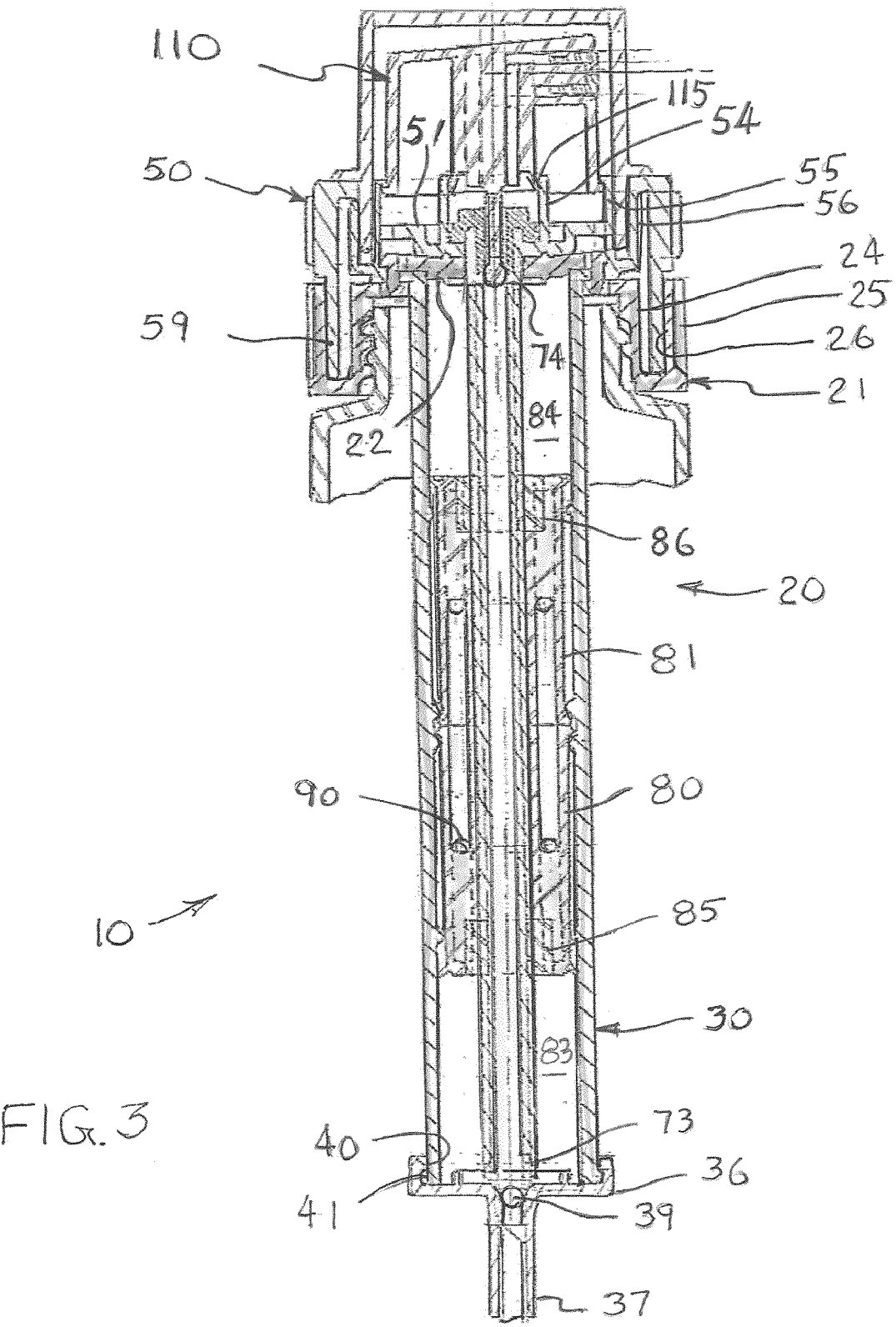
FIG. 3 is a cross-sectional view like FIG. 2, but showing the opposing pistons in the charged or "loaded" position, ready for product to be dispensed.
Figure 7:
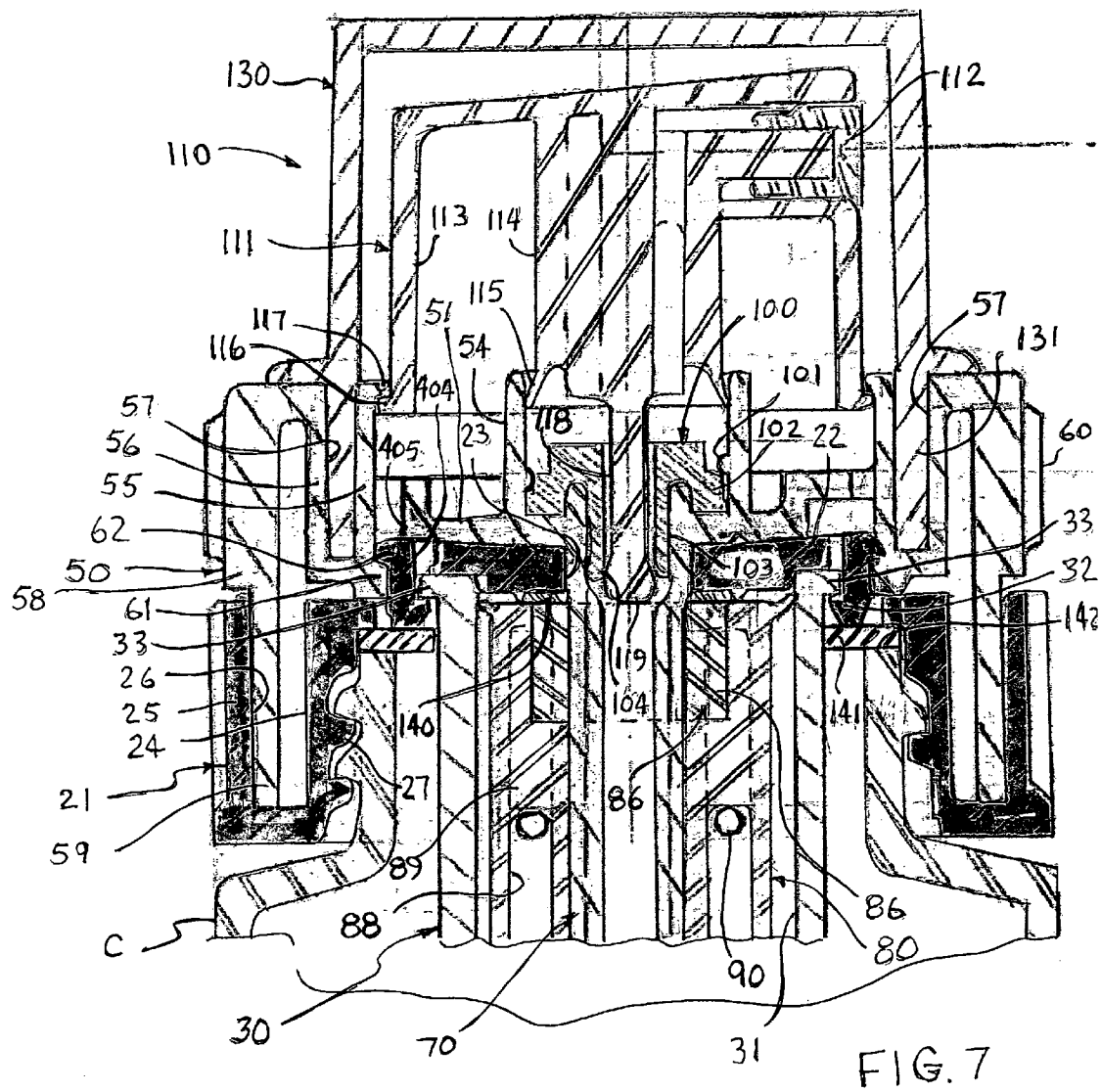
FIG. 7 is a greatly enlarged fragmentary longitudinal sectional view of the actuator assembly of the present invention.

The actuator assembly 110 comprises an actuator body 111 with a mechanical breakup unit (MBU) insert 112, a depending skirt 113 reciprocable against an inner surface of the wall 55 of the actuating collar, and a depending central post 114 that is reciprocable within seal wall 54. A seal 115 on the bottom end of post 114 effects a sliding seal with the wall 54, and an outwardly directed flange 116 on the bottom edge of the skirt 113 is engaged beneath an inwardly directed flange 117 on the upper edge of wall 55 on the actuating collar to hold the actuator body assembled to the actuating collar. A valve stem 118 extends downwardly from the post 114 and through the retainer ring 100. An enlarged valve head 119 on the bottom end of the stem seats against the valve seat 104 on the retainer ring 100 when the actuator body is in its at-rest position as shown in FIGS. 2, 3 and 7.

An overcap 130 has a depending skirt 131 received in the pocket 57 in the actuating collar.

Two seal rings 140 around the upper end of shaft 70 rotationally contact the underside of the cylinder retainer closure 21 and the upper facial surface of the upper piston 80 when it is in its at-rest position at the top of the cylinder 30, and a bottle seal gasket 141 is seated between the top surface of the bottle neck finish 142 and the underside area of the cylinder retainer closure 21.

When it is desired to dispense product, the actuating collar 50 and attached shaft 70 are rotated, causing the pistons 80 and 81 to rotate because of the splined engagement between the pistons and shaft. Further, because of engagement between the helixes 87, 87' on the outer surface of the pistons and the helixes 34, 35 on the inner surface of the cylinder, the rotational movement of the pistons is transformed into axial movement of the pistons toward one another to the positions shown in FIG. 3. This action produces a vacuum in the product chambers 83 and 84, drawing product past the ball check valve 39 into the bore 72 of shaft 70 and thence outwardly through feed slots 73 and 74 and into the chambers 83 and 84. This also compresses spring 90, which exerts a return force on the pistons and applies pressure to the product in the chambers. As long as valve 119 is seated on seat 104, the pressurized product is trapped in the chambers 83 and 84, but when the actuator is depressed to unseat the valve, the spring acts against the pistons to force the product from the chambers 83 and 84 back through the feed slots into the bore 72 and past the valve 119 to and through the mechanical break up unit. Only a single turn of the actuating collar is required to fully charge the product chambers and obtain a duration spray without further action when the actuator is depressed. When product is depleted from the chambers the unit is ready for another dispensing cycle.

A second preferred embodiment of the invention is indicated generally at 200 in FIGS. 8-10. This form of the invention functions essentially the same as the previous embodiment but differs therefrom in that it has a pneumatic force generator 210 rather than the spring 90, the retainer ring 100 is omitted, the cylinder 211 has a necked down section 212 midway between its ends, the opposed helixes 34' and 35' are located toward the ends of the cylinder and are oriented oppositely to their orientation in FIGS. 2-4, and the pistons 80' and 81' are inverted end-to-end and move in opposite directions between their at-rest and charged positions relative to their orientation and movement in the previous embodiment. In addition, the shaft 70' has a feed opening 213 midway between its ends rather than the feed slots 73 and 74 at opposite ends of the shaft as in the previous embodiment. The pistons are shown in their charged positions in FIG. 8 and in their at-rest positions in FIG. 9.

The pneumatic force generator 210 comprises a pressure chamber 214 attached to the bottom end of the cylinder 211 with an adapter 215. A tubular member 216 extends coaxially within the chamber from the bottom wall 217 of the chamber to its open upper end, and the wall 217 has a hole 218 therethrough in communication with a charging tube 219. The hole 218 normally is covered by a one way gasket fill valve 220. A dip tube 221 is connected with the tubular member 216 and a check valve ball 222 seats against the upper end of the tubular member. A drive piston 223 having an extended end 224 is reciprocable in the pressure chamber 214 and is slidably sealed with respect to the chamber wall and the tubular member by O-rings 225 and 226, respectively.

In use, a charge preload is placed in the chamber 214 via the charging tube 219 and hole 218, applying pressure to the drive piston 223 and forcing the extended end 224 upwardly into the cylinder to the position shown in FIG. 9. The pistons 80' and 81' are normally in their at-rest positions at the middle of the cylinder, as shown in FIG. 9, with the drive piston engaged against the piston 80'.

To initiate a dispensing cycle, the actuating collar and thus the shaft 70' are rotated, and because of engagement between the helixes on the pistons and in the cylinder the pistons are caused to move axially away from one another to the charged positions at opposite ends of the cylinder as shown in FIG. 8. This movement of the pistons pushes the drive piston 223 downwardly, compressing the pneumatic charge in the chamber 214 and creating a vacuum in the cylinder between the pistons, drawing product up through the dip tube, past the ball valve 222 into the interior of shaft 70', and through the feed opening 213 into the product charge chamber 226 between the pistons. The compressed pneumatic charge in chamber 214 urges the drive piston against the piston 80', causing the piston to exert pressure on the product in chamber 226, but because the valve 119 in the actuator assembly is seated, product cannot escape from the chamber and the pistons remain in their charged positions shown in FIG. 8. When the actuator is operated to unseat valve 119, enabling escape of product from chamber 226, the compressed pneumatic charge acts on the drive piston to push piston 80' upwardly along shaft 70' back toward the center of the cylinder. Because of the splined connection between the shaft and pistons and the engagement of the helixes on the pistons and cylinder, this movement of the lower piston causes rotation of the shaft 70' with the result that the upper piston 81' is caused to move along the shaft toward the opposite piston, forcing the product in chamber 226 outwardly past valve 119 and through the MBU 112. The system is now ready for another dispensing cycle.

A third preferred embodiment of the invention is indicated generally at 300 in FIGS. 11-14. In this form of the invention the pneumatic force generator of the previous embodiment is replaced with a stretchable elastic force generator 301 attached to a modified piston 302.

The force generator 301 comprises a cylindrical housing 303 similar to the chamber 214 in the previous embodiment, attached to the bottom end of cylinder 304 with an adaptor 305 and having a tubular member 306 extending up the center thereof with a valve seat 307 and a one-way check ball valve 308 at its upper end to enable flow from a dip tube 220 but prevent reverse flow. A splined shaft 70' extends coaxially in the cylinder 304, with its lower end in slightly spaced aligned confronting relationship with the upper end of the tubular member 306 in housing 303. A stretchable elastic fitment 309 has a radially inwardly directed flange 310 inset slightly into one end of the fitment, and this flange is sandwiched between the confronting ends of the shaft 70' and tubular member 306. The other end of the fitment has a radially outwardly directed flange 311 with an upwardly facing channel 312 in it. The modified piston has a cylindrical extension 313 adapted to reciprocate into and out of the housing 303, and the end of the extension is seated within the channel 312. The piston body has a cog seal insert 85 and helixes 87, 87' for cooperation with the splined shaft 70' and helixes 34', 35' in the cylinder, respectively, as in the embodiment of FIGS. 8-10.

Thus, when the actuator collar 50 (not shown in FIGS. 11-14) is rotated, the attached shaft 70' rotates, and due to the interaction between the splined shaft and cog seal insert and between the helixes on the piston and the helixes in the cylinder, causes the piston to move from its at-rest position in FIG. 11 to its charged position in FIG. 14. This movement creates a vacuum in chamber 313 in cylinder 304, drawing product up through the dip tube 220, past valve 308 and into chamber 313. It also stretches the fitment 309 from its relaxed condition shown in FIG. 11 to its stretched energy storage condition shown in FIG. 14. Accordingly, when the valve 119 in the actuator assembly is unseated, the fitment pulls against the piston extension and drives the piston upwardly in cylinder 304 to force product from the chamber 313 and through the open valve 119 and MBU 112.

A fourth preferred embodiment of the invention is indicated generally at 400 in FIGS. 15 and 16. This form of the invention is essentially the same as that form shown in FIGS. 2-7, except that only one piston 81 is used and the cylinder 30' is shortened accordingly, with spring 90 engaged between the piston and dip tube receptor 36. In all other respects, this form of the invention functions identically to that form shown in FIGS. 2-7.

One suitable venting means usable with all forms of the invention disclosed herein is shown in FIGS. 7, 15 and 16. The venting means comprises a vent hole 404 through the wall 22 of cylinder retainer closure 21, and a seal pad 405 on the underside of wall 51 of actuating collar 50 that normally closes the vent hole but moves to expose the hole when the actuating collar is turned. The vent permits replenishment of air into the container C during dispensing cycles, achieving pressure differential equilibrium within the container.

Figure 17:
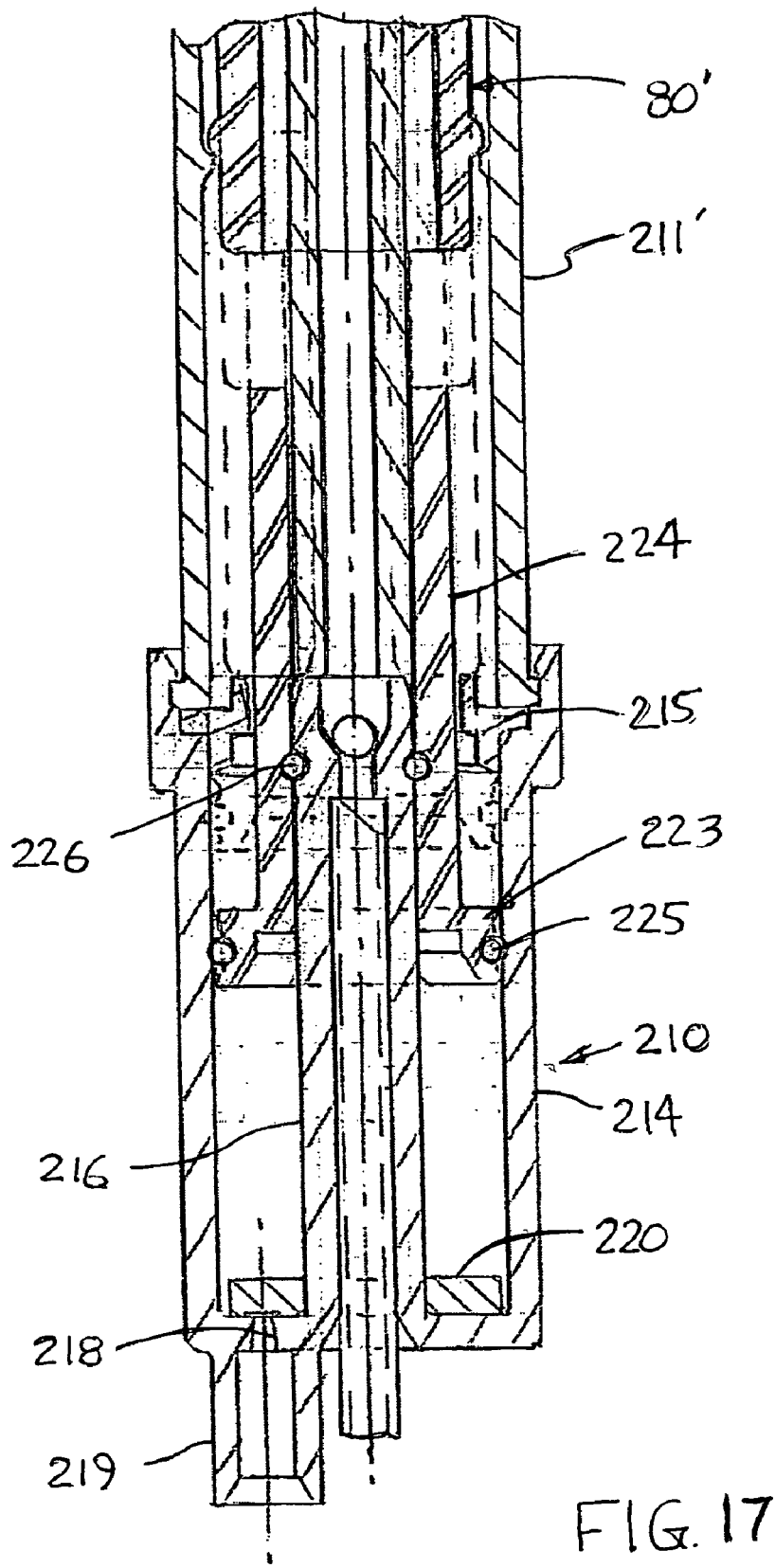
FIG. 17 is a partial longitudinal cross-sectional view of an alternate embodiment to FIGS. 8 and 9, wherein only a single piston and associated pneumatic force generator are used.

FIG. 17 illustrates another embodiment substantially identical to that form illustrated in FIGS. 8-10, except that one of the pistons is omitted and only a single piston 80' and correspondingly shortened cylinder 211' is used. In all other respects, this form of the invention functions identically to the form shown in FIGS. 8-10.

All embodiments require one turn of the actuating collar, which can be either left or right in design. Turning of the actuating collar causes the opposing pistons, or the piston in some embodiments, to travel along the cogged shaft and create a vacuum that draws product into the voided chamber or chambers through the inlet check valve means. This movement of the piston or pistons also stores energy in an energy storage means. Once this action has been implemented, the outlet valve means prevents the product from being discharged through the spray head actuator under the influence of the energy storage means. By pressing down on the spray actuator head, the product is released over a predetermined duration. Venting occurs during each dispensing cycle. The venting means also serves as the shipper seal for the package en-route to its destination. The convenience of use of the present invention borders on the convenience of conventional chemically driven systems since it is not necessary to repeatedly pump an actuator to get short spurts of product, thereby also eliminating finger fatigue that is experienced from operating conventional mechanically operated systems. The embodiments of the invention disclosed herein provide duration spray and convenience not available to date, and at an affordable cost.

Since numerous modifications and combinations of the above embodiments can be arranged as shown above, and these embodiments will readily occur to those skilled in the art, it is not desired to limit the invention to the exact construction and process shown and described herein. Accordingly, resort may be made to all suitable modifications and equivalents that fall within the scope of the invention as defined by the appended claims. The words "comprise", "comprises", "comprising", "include(s)", and "including" when used in this specification and in the appended claims are intended to specify the presence of stated features or steps, but they do not preclude the presence or addition of one or more other features, steps or groups thereof.

What is claimed:

1. A mechanically energized duration spray mechanism for use with a container of product to be dispensed, said mechanism comprising:

a cylinder retainer closure having means thereon for attachment to an upper end of a container to close the container, said cylinder retainer closure having a central opening therethrough;

an elongate cylinder having an upper end, a closed lower end having an opening therethrough, and an interior surface defining a hollow bore extending through said cylinder, said cylinder upper end immovably connected to said cylinder retainer closure at a central portion thereof and depending therefrom with said hollow bore thereof in aligned registry with the central opening through said cylinder retainer closure;

a rotatable actuating collar connected to said cylinder retainer closure for rotational movement relative thereto but fixed against relative axial movement therebetween, said actuating collar having a central opening therethrough in aligned registry with the central opening through said cylinder retainer closure, and an elongate shaft depending from a central portion thereof and extending through said central opening in said cylinder retainer closure, with a lower end of said shaft adjacent the lower end of said cylinder, said shaft extending coaxially into said cylinder from said actuating collar and being rotatable with said actuating collar but fixed against relative axial movement therebetween, said shaft having an interior hollow bore extending throughout its length, said hollow bore of said shaft being in aligned registry with said central opening through said cylinder retainer closure and with the opening through said closed lower end of said cylinder, said shaft having a splined outer surface in inwardly spaced relation to said cylinder interior surface and at least one opening therein establishing fluid communication between the hollow bore of said shaft and the hollow bore of said cylinder;

first valve means associated with said central opening through said cylinder retainer closure;

a valve actuator connected with said first valve means to move said first valve means from a closed position to an open position with respect to said central opening through said actuating collar to selectively block or permit fluid flow through said central opening;

second valve means associated with said opening through said closed lower end of said cylinder, said second valve means operable to permit flow of product into said hollow bore of said cylinder but prevent reverse flow therethrough;

two annular pistons mounted on said shaft in sealed axially sliding relationship relative thereto for simultaneous movement of said pistons in opposite directions relative to one another, said pistons being fixed against rotational movement relative to said shaft and each having an outer surface engaged with said interior surface of said cylinder in sealed sliding relationship thereto;

interengaged means between said outer surface of said pistons and said interior surface of said cylinder to cause said pistons to move in a first direction relative to one another within said cylinder when said actuating collar and said shaft are rotated in a first direction relative to said cylinder, said movement of said pistons in said first direction being operable to draw product through said second valve means and into said hollow bore of said shaft and through said opening therein and into the hollow bore of said cylinder when said mechanism is mounted on a container of product; and energy storage means associated with said pistons and said cylinder to store energy when said pistons are moved in said first direction relative to one another, said energy storage means being operable to move said pistons in a second direction relative to one another opposite to said first direction to exert pressure on product drawn into said hollow bore of said cylinder and force it through said first valve means in said actuating collar when said mechanism is mounted on a container of product to be dispensed and said valve actuator is operated to move said first valve means to open position.

2. A mechanically energized duration spray mechanism as claimed in claim 1, wherein:

said energy storage means comprises a spring engaged with said at least one piston to move it in said second direction.

3. A mechanically energized duration spray mechanism as claimed in claim 1, wherein:

said energy storage means comprises a pneumatic means connected with said cylinder bore, said pneumatic means containing a gas and movement of said pistons in said first direction serving to compress said gas and pressurize it, said pressurized gas exerting a force on said pistons in said second direction, whereby when said mechanism is mounted on a container of product to be dispensed said pistons move in said second direction to expel product from said cylinder bore upon opening of said first valve means.

4. A mechanically energized duration spray mechanism as claimed in claim 1, wherein:

said energy storage means comprises an elastomeric member connected with said at least one piston so that the elastomeric member is elastically deformed when said at least one piston is moved in said first direction, exerting a force in said second direction on said at least one piston, whereby when said mechanism is mounted on a container of product to be dispensed said at least one piston moves in said second direction to expel product from said cylinder bore upon opening of said first valve means.

5. A mechanically energized duration spray mechanism as claimed in claim 1, wherein:

said two pistons have at-rest positions at respective opposite ends of said cylinder, each said piston having a said first direction of movement away from their respective end of said cylinder and toward a longitudinally central portion of the cylinder upon rotation of said actuating collar and said shaft in said first direction, and a said second direction of movement away from the central portion of the cylinder back toward the respective opposite ends of the cylinder;

said at least one opening in said shaft comprises an opening in the side of each of the opposite ends of said shaft, said openings establishing fluid communication between the shaft bore and opposite ends of the cylinder bore between the respective pistons and respective adjacent ends of the cylinder, whereby upon movement of said pistons in their said first directions product is drawn into said shaft bore and outwardly through said openings therein into said respective opposite ends of the cylinder bore; and said energy storage means comprises a spring engaged between said two pistons, said spring being compressed upon movement of said pistons in their said first directions and operable to move the pistons in their respective said second directions from the central portion of the cylinder back toward the respective opposite ends of the cylinder, whereby when said mechanism is mounted on a container of product to be dispensed said pistons exert pressure on product in said opposite ends of the cylinder bore and force it back into the shaft bore and outwardly through the first valve means when the first valve means is opened.

6. A mechanically energized duration spray mechanism as claimed in claim 1, wherein:

said two pistons have at-rest positions at a longitudinally central portion of the cylinder, each said piston having a said first direction of movement away from their central positions toward respective opposite ends of said cylinder upon rotation of said actuating collar and said shaft in said first direction, and a said second direction of movement away from the respective opposite ends of the cylinder and back toward the central portion of the cylinder;

said at least one opening in said shaft establishes fluid communication between the shaft bore and a central portion of the cylinder bore between the respective pistons, whereby when said mechanism is mounted on a container of product to be dispensed product is drawn into said shaft bore and outwardly through said opening therein into said central portion of the cylinder bore upon movement of said pistons in their said first directions; and said energy storage means comprises pneumatic means connected with said cylinder bore, said pneumatic means containing a gas and movement of said pistons in their said first direction serving to compress said gas and pressurize it, said pressurized gas exerting a force on one of said pistons causing it to move in said second direction which causes said shaft to rotate and thereby move the other of said pistons in its said second direction, whereby when said mechanism is mounted on a container of product to be dispensed said pistons move in their said second direction to exert pressure on the product in the central portion of the cylinder bore to expel it from the cylinder bore upon opening of said first valve means.

7. A mechanically energized duration spray mechanism as claimed in claim 6, wherein:

said pneumatic means includes a drive piston connected between said pressurized gas and said one piston, said pressurized gas exerting force on said drive piston in said second direction which in turn exerts force on said one piston in said second direction.

8. A mechanically energized duration spray mechanism as claimed in claim 3, wherein:

said pneumatic means includes a drive piston connected between said pressurized gas and said at least one piston, said pressurized gas exerting force on said drive piston in said second direction which in turn exerts force on said at least one piston in said second direction.

9. A mechanically energized duration spray mechanism as claimed in claim 1, wherein:

said interengaged means between said outer surface of said pistons and said interior surface of said cylinder comprises a protrusion on one of said surfaces and a complementally shaped recess in the other of said surfaces.

10. A mechanically energized duration spray mechanism as claimed in claim 1, wherein:

said cylinder retainer closure and said actuating collar each has an outer peripheral wall with gripping means thereon to facilitate gripping and turning said actuating collar.

11. A mechanically energized duration spray mechanism as claimed in claim 4, wherein:

said elastomeric member is connected to be stretched when said at least on piston is moved in said first direction.

12. A mechanically energized duration spray mechanism as claimed in claim 1, wherein:

said cylinder upper end is connected to a bottom side of said cylinder retainer closure; and said actuating collar is connected to said cylinder retainer closure at an upper side of the cylinder retainer closure.

13. A mechanically energized duration spray mechanism as claimed in claim 1, wherein:

said pistons each have splines on an interior surface thereof engaged with the splines on the exterior surface of said shaft to prevent relative rotation between said pistons and said shaft; and the interengaged means between said outer surface of said pistons and said interior surface of said cylinder comprises raised camming helixes on the outer surface of said pistons and the interior surface of said cylinder.

14. A mechanically energized duration spray mechanism for use with a container of product to be dispensed, said mechanism comprising:

a cylinder retainer closure having means thereon for attachment to an upper end of a container to close the container, said cylinder retainer closure having a central opening therethrough;

an elongate cylinder having an upper end connected to said cylinder retainer closure in coaxial relationship with the central opening therethrough and depending therefrom to a closed lower end with an opening therethrough, said cylinder having an interior surface defining a hollow bore extending through said cylinder;

a rotatable actuating collar connected to said cylinder retainer closure for rotational movement relative thereto but fixed against relative axial movement therebetween, said actuating collar having an elongate shaft depending from a central portion thereof and extending through the central opening in said cylinder retainer closure, with a lower end of said shaft disposed adjacent the lower end of said cylinder, said shaft being rotatable with said actuating collar and having a cylindrical wall with an interior hollow bore extending throughout its length, said hollow bore of said shaft being in aligned registry with the opening through said closed lower end of said cylinder and the cylindrical wall of said shaft having a splined outer surface in inwardly spaced relation to said cylinder interior surface and at least one opening therein establishing fluid communication between the hollow bore of said shaft and the hollow bore of said cylinder;

first valve means associated with said central opening through said actuating collar;

a valve actuator connected with said first valve means to move said first valve means from a closed position to an open position with respect to said central opening through said actuating collar to selectively block or permit fluid flow through said central opening;

second valve means associated with said opening through said closed lower end of said cylinder, said second valve means operable to permit flow of product into said hollow bore of said cylinder but prevent reverse flow therethrough;

at least one annular piston mounted on said shaft in sealed axially sliding relationship relative thereto, said at least one piston being fixed against rotational movement relative to said shaft and having an outer surface engaged with said interior surface of said cylinder in sealed sliding relationship thereto;

interengaged means between said outer surface of said at least one piston and said interior surface of said cylinder to cause said at least one piston to move axially in a first direction within said cylinder when said actuating collar and said shaft are rotated in a first direction relative to said cylinder, said movement of said at least one piston in said first direction being operable to draw product through said second valve means and into said hollow bore of said shaft and through said opening therein and into the hollow bore of said cylinder when said mechanism is mounted on a container of product; and energy storage means associated with said at least one piston and said cylinder to store energy when said at least one piston is moved in said first direction, said energy storage means being operable to move said at least one piston in a second direction opposite to said first direction to exert pressure on product drawn into said hollow bore of said cylinder and force it through said at least one opening in shaft wall and through said first valve means in said actuating collar when said mechanism is mounted on a container of product to be dispensed and said valve actuator is operated to move said first valve means to open position.

15. A mechanically energized duration spray mechanism as claimed in claim 14, wherein:
said at least one piston comprises a single piston mounted on said shaft at one end of said cylinder; and
said energy storage means comprises a spring engaged between said piston and an opposite end of said cylinder.

16. A mechanically energized duration spray mechanism as claimed in claim 14, wherein:
said interengaged means between said outer surface of said at least one piston and said interior surface of said cylinder comprises a protrusion on one of said surfaces and a complementally shaped recess in the other of said surfaces.

17. A mechanically energized duration spray mechanism as claimed in claim 14, wherein:
said at least one piston has splines on an interior surface thereof engaged with the splines on the exterior surface of said shaft to prevent relative rotation between said at least one piston and said shaft; and
the interengaged means between said outer surface of said at least one piston and said interior surface of said cylinder comprises raised camming helixes on the outer surface of said at least one piston and the interior surface of said cylinder.

18. A mechanically energized duration spray mechanism for use with a container of product to be dispensed, said mechanism comprising:
a cylinder retainer closure having means thereon for attachment to an upper end of a container to close the container, said cylinder retainer closure having a central opening therethrough;

an elongate cylinder having an upper end connected to said cylinder retainer closure at a central portion thereof and depending therefrom to a closed lower end having an opening therethrough, said cylinder having a substantially uniform diameter throughout its length and an interior surface defining a hollow bore extending through said cylinder;

a rotatable actuating collar mounted to said cylinder retainer closure for rotational movement relative thereto but fixed against relative axial movement therebetween;

an elongate shaft depending from a central portion of said actuating collar and extending through said central opening in said cylinder retainer closure, said shaft having a substantially uniform diameter throughout its length and a lower end adjacent the lower end of said cylinder, said shaft extending coaxially into said cylinder from said actuating collar and being rotatable with said actuating collar and having an interior hollow bore extending throughout its length, said hollow bore of said shaft being in aligned registry with said central opening through said actuating collar and with the opening through said closed lower end of said cylinder, said shaft having a splined outer surface in inwardly spaced relation to said cylinder interior surface and at least one opening in a side thereof establishing fluid communication between the hollow bore of said shaft and the hollow bore of said cylinder;

first valve means associated with said central opening through said actuating collar;

a valve actuator connected with said first valve means to move said first valve means from a closed position to an open position with respect to said central opening through said actuating collar to selectively block or permit fluid flow through said central opening;

second valve means associated with said opening through said closed lower end of said cylinder, said second valve means operable to permit flow of product into said hollow bore of said cylinder but prevent reverse flow therethrough;

at least one annular piston mounted on said shaft in sealed axially sliding relationship relative thereto, said at least one piston being fixed against rotational movement relative to said shaft and having an outer surface engaged with said interior surface of said cylinder in sealed sliding relationship thereto;

interengaged means between said outer surface of said at least one piston and said interior surface of said cylinder to cause said at least one piston to move axially in a first direction within said cylinder when said actuating collar and said shaft are rotated in a first direction relative to said cylinder, said movement of said at least one piston in said first direction being operable to draw product through said second valve means and into said hollow bore of said shaft and through said opening therein and into the hollow bore of said cylinder when said mechanism is mounted on a container of product; and energy storage means associated with said at least one piston and said cylinder to store energy when said at least one piston is moved in said first direction, said energy storage means being operable to move said at least one piston in a second direction opposite to said first direction to exert pressure on product drawn into said hollow bore of said cylinder and force it through said first valve means in said actuating collar when said mechanism is mounted on a container of product to be dispensed and said valve actuator is operated to move said first valve means to open position.

19. A mechanically energized duration spray mechanism as claimed in claim 14, wherein:

said energy storage means comprises a pneumatic means connected with said cylinder bore, said pneumatic means containing a gas and movement of said at least one piston in said first direction serving to compress said gas and pressurize it, said pressurized gas exerting a force on said at least one piston in said second direction, whereby when said mechanism is mounted on a container of product to be dispensed said at least one piston moves in said second direction to expel product from said cylinder bore upon opening of said first valve means.

20. A mechanically energized duration spray mechanism as claimed in claim 14, wherein:

said energy storage means comprises an elastomeric member connected with said at least one piston so that the elastomeric member is elastically deformed when said at least one piston is moved in said first direction, exerting a force in said second direction on said at least one piston, whereby when said mechanism is mounted on a container of product to be dispensed said at least one piston moves in said second direction to expel product from said cylinder bore upon opening of said first valve means.

21. A mechanically energized duration spray mechanism for use with a container of product to be dispensed, said mechanism comprising:

a cylinder retainer closure having means thereon for attachment to an upper end of a container to close the container, said cylinder retainer closure having a central opening therethrough;

an elongate cylinder having an upper end, a closed lower end having an opening therethrough, and an interior surface defining a hollow bore extending through said cylinder, said cylinder upper end connected to said cylinder retainer closure at a central portion thereof and depending therefrom with said hollow bore thereof coaxial with the central opening through said cylinder retainer closure;

a rotatable actuating collar connected to said cylinder retainer closure for rotational movement relative thereto but fixed against relative axial movement therebetween;

an elongate shaft depending from a central portion of said actuating collar and extending through said central opening in said cylinder retainer closure, with a lower end of said shaft adjacent the lower end of said cylinder, said shaft being rotatable with said actuating collar and having an interior hollow bore extending throughout its length, said hollow bore of said shaft being in aligned registry with the opening through said closed lower end of said cylinder, said shaft having a splined outer surface in inwardly spaced relation to said cylinder interior surface and at least one opening therein establishing fluid communication between the hollow bore of said shaft and the hollow bore of said cylinder;

first valve means associated with said central opening through said cylinder retainer closure;

a valve actuator connected with said first valve means to move said first valve means from a closed position to an open position with respect to said central opening through said actuating collar to selectively block or permit fluid flow through said central opening;

second valve means associated with said opening through said closed lower end of said cylinder, said second valve means operable to permit flow of product into said hollow bore of said cylinder but prevent reverse flow therethrough;

two annular pistons mounted on said shaft in sealed axially sliding relationship relative thereto for simultaneous movement of said pistons in opposite directions relative to one another, said pistons being fixed against rotational movement relative to said shaft and each having an outer surface engaged with said interior surface of said cylinder in sealed sliding relationship thereto;

interengaged means between said outer surface of said pistons and said interior surface of said cylinder to cause said pistons to move in a first direction relative to one another within said cylinder when said actuating collar and said shaft are rotated in a first direction relative to said cylinder, said movement of said pistons in said first direction being operable to draw product through said second valve means and into said hollow bore of said shaft and through said opening therein and into the hollow bore of said cylinder when said mechanism is mounted on a container of product; and energy storage means associated with said pistons and said cylinder to store energy when said pistons are moved in said first direction relative to one another, said energy storage means being operable to move said pistons in a second direction relative to one another opposite to said first direction to exert pressure on product drawn into said hollow bore of said cylinder and force it through said first valve means in said actuating collar when said mechanism is mounted on a container of product to be dispensed and said valve actuator is operated to move said first valve means to open position.

* * * * *